March 20, 1962 — M. N. HILLYER ETAL — 3,025,757
VIEWING SCREEN ASSEMBLY FOR MOVIE PROJECTORS
Filed Jan. 19, 1959
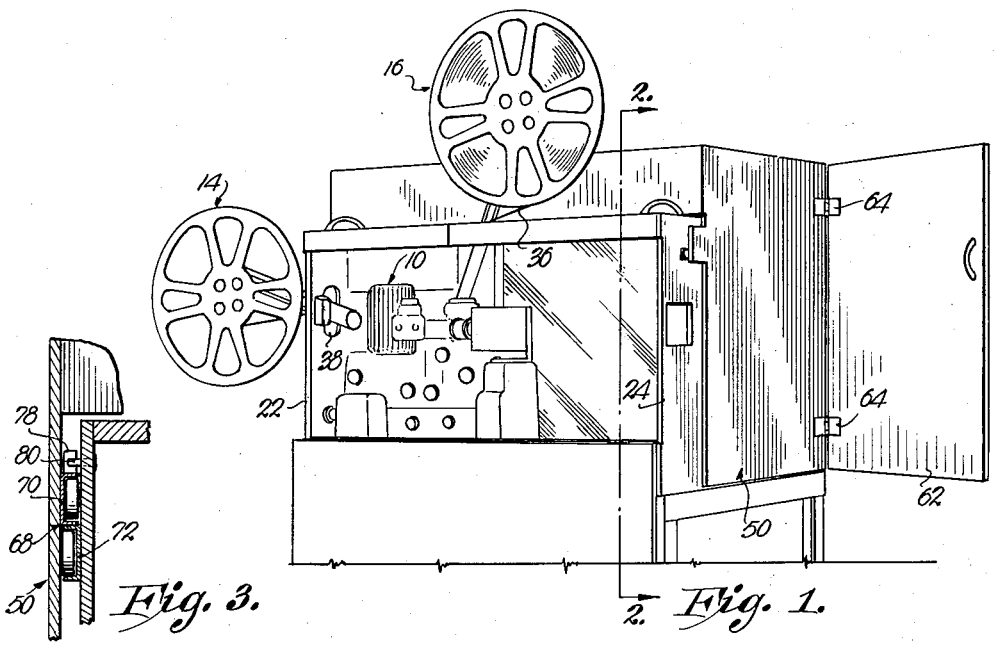
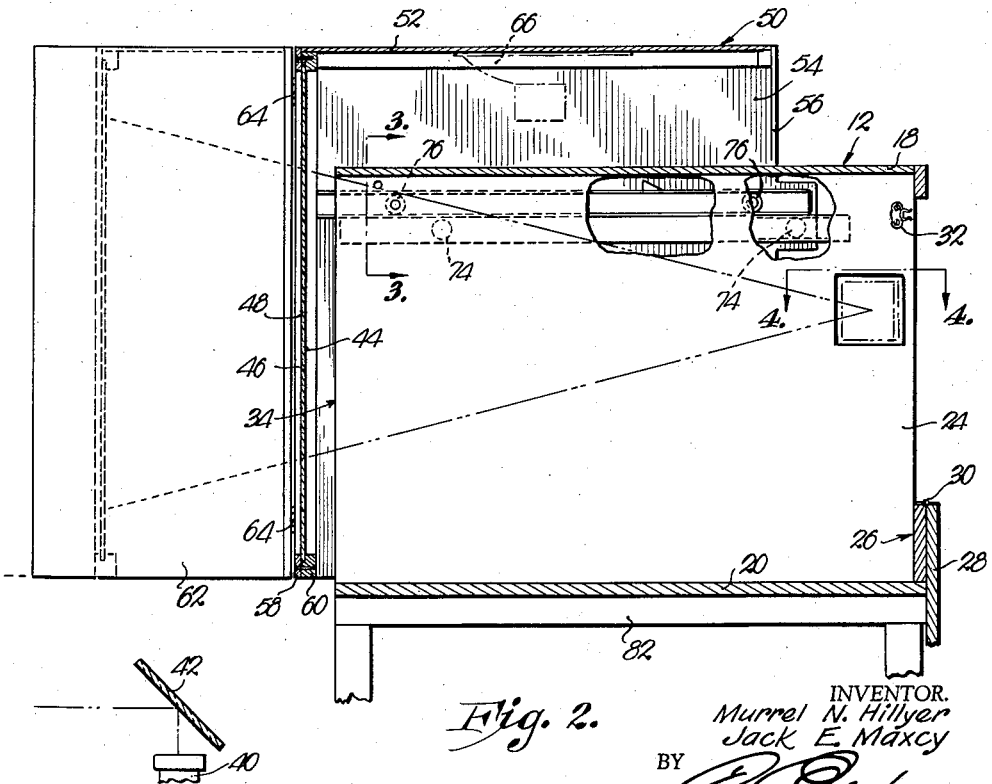
INVENTOR.
Murrel N. Hillyer
Jack E. Maxcy
BY
ATTORNEY

United States Patent Office 3,025,757
Patented Mar. 20, 1962

3,025,757
VIEWING SCREEN ASSEMBLY FOR
MOVIE PROJECTORS
Murrel N. Hillyer and Jack E. Maxcy, Temple, Tex., assignors to Hoover Brothers, Incorporated, Kansas City, Mo., a corporation of Missouri
Filed Jan. 19, 1959, Ser. No. 787,597
2 Claims. (Cl. 88—24)

This invention relates to the field of optics and more particularly to the projection of images on a viewing screen such as through the use of a movie projector, the primary object being to combine the projector and the screen in a single, composite instrument in a manner to eliminate the necessity of setting up a separate projector and to obviate many other inconveniences incident thereto.

It is the most important object of the present invention to provide a combined unit of the aforementioned character having means for easily and quickly adjusting not only the size but the brightness of the images being viewed on the screen.

Another important object of the present invention is to utilize a translucent screen through which the images may be projected and to mount the screen in a manner for movement toward and away from the lens of the projector so that the images may be varied in size and intensity.

Other objects include the way in which there is provided a housing for the projector which in turn carries the screen through use of a sleeve partially embracing the body and reciprocable therealong, all for the purpose of permitting the shifting of such screen toward and away from one open end of the body and therefore, the projector.

In the drawing:

FIG. 1 is a fragmentary, rear perspective view of a viewing screen assembly for movie projectors made pursuant to our present invention showing the doors open.

FIG. 2 is an enlarged, vertical, cross-sectional view taken substantially on line 2—2 of FIG. 1 and illustrating the movement of the viewing screen.

FIG. 3 is a fragmentary, detailed, cross-sectional view still further enlarged taken on line 3—3 of FIG. 2; and FIG. 4 is a fragmentary, detailed, cross-sectional view taken on line 4—4 of FIG. 2.

A conventional movie projector broadly designated by the numeral 10 and chosen to illustrate the principles of the instant invention, is shown in FIG. 1 of the drawing housed within a hollow body 12 except only that the reels 14 and 16 are more conveniently mounted exteriorly of the body 12.

Body 12 is provided with a top 18, a bottom 20, a pair of sides 22 and 24, an end broadly designated by the numeral 26 and including a door 28 that may be closed by virtue of hinges 30 and held closed through the provision of latch 32, and an open end 34 in opposed relationship to the normally closed end 26.

It is noted that the reels 14 and 16 are carried by side 22 and top 18 respectively, tape 36 passing through an opening 38 in side 22 and through a similar opening (not shown) in top 18.

Images emanating from the lens (not shown) in focusing mount 40 of projector 10, are reflected through the open end 34 of body 12 by an angularly disposed mirror 42 carried by the body 12 therewithin adjacent end 26.

Such images are directed to one face 44 of a screen 46 made of translucent material and, therefore, such images become visible on the opposite face 48 of the screen 46.

Screen 46 is carried by a sleeve 50 mounted on the body 12 for horizontal reciprocation. Sleeve 50 is essentially U-shaped including therefore, a bight 52 overlying the top 18 and a pair of legs depending from the bight 52 along the sides 22 and 24, one of such legs 54 being illustrated in FIGS. 1, 2 and 3. The two legs 54 are interconnected between top 18 and bight 52 by a rear panel 56. Screen 46 encloses the opposite end of the sleeve 50 spanning the distance between the legs 54 and depending from the bight 52 to the lowermost ends of the legs 54 to a point substantially coincident with the horizontal plane of bottom 20.

A continuous frame carried by the sleeve 50 and surrounding the screen 46 consists of two sections 58 and 60 between which the screen 46 is clamped. Sleeve 50 also supports a pair of doors, one of which is shown in FIGS. 1 and 2 and designated by the numeral 62, supported by hinges 64 for movement to closed positions covering the screen 46 when the device is not in use.

It is noted that the bight 52 of sleeve 50 is spaced above the top 18 thereby accommodating a speaker 66 for projector 10 which is attached to the bight 52 in depending relationship thereto, bight 52 being provided with a screened opening (not shown) in register with the speaker 66 in the usual manner.

Each side 22 and 24 is provided with track means 68 supporting the corresponding leg 54 in the manner illustrated in FIGS. 2 and 3. While only one of such track means is illustrated, the same are identical and each includes a pair of elongated, horizontally disposed channels 70 and 72 attached directly to the corresponding leg 54 and side 22 or 24 respectively as the case may be.

A pair of spaced rollers 74 within the lowermost channel member 72 is attached to the inner face of the corresponding leg 54 and a similar pair of spaced rollers 76 within the upper channel member 70 is attached to the corresponding side 22 or 24. The extent of outward movement of the screen 46 away from open end 34 of body 12 is limited by an upstanding ear 78 on channel member 70 disposed to strike an outwardly extending pin 80 on body 12. As illustrated in FIGS. 1 and 2, the entire device may be supported at any desired height through the medium of a table or the like 82.

As above indicated, the door 28 is closed and the doors 62 are open during use. The images from the projector 10 are clearly visible on the outer face 48 of the screen 46 and the brightness, as well as the dimensions of such images, vary as the sleeve 50 is adjusted by reciprocating the same with repect to the body 12 as made possible by the track means 68.

FIG. 2 of the drawing illustrates the way in which the image size on the outer face 48 of screen 46 progressively increases as the screen 46 is moved farther away from the open end 34 of body 12. On the other hand, under certain conditions of use wherein the size of the picture is immaterial, but brightness is an important factor, the operator can easily and quickly shift the sleeve 50 so as to bring the screen 46 closer to the open end 34 and, therefore, closer to the mirror 42 from which the images are reflected.

Having thus described the invention, what is claimed as new and desired to be secured by Letters Patent is:

1. In combination with an optical instrument for projecting images, a hollow body having a top, a bottom, a pair of sides and an open end, said body being supported uprightly on the bottom thereof; a U-shaped sleeve partially embracing the body and supported thereby, said sleeve having a bight overlying the top and a pair of legs depending from the bight alongside said sides; track means proximal to said top between said legs and said sides mounting the sleeve on the body for horizontal reciprocation, said track means including a pair of channels secured to each side of said body and a pair of horizontally spaced rollers secured to said legs and associated with each channel for rolling reciprocation therein; and a screen disposed across said open end, said instrument being housed within said body and disposed to project images through said open end and against one face of the screen, said screen being of translucent material, rendering the images visible on the opposite face of the screen, said screen being attached to said legs for movement with the sleeve toward and away from said open end of the body as the sleeve is reciprocated, whereby the size and brightness of the images on said opposite face of the screen may be varied.

2. In combination with an optical instrument for projecting images, a hollow body having a top, a pair of spaced sides depending from the top, and an open end, said instrument being disposed to project images from within the body through said open end of the latter; a U-shaped, opaque, rigid sleeve looped over the body, said sleeve have a bight overlying said top and a pair of legs depending from said bight along said sides, one end of the sleeve being open; track means interposed between each of said sides and its corresponding leg, mounting the sleeve on the body for horizontal reciprocation; and a vertical screen secured to the sleeve in closing relationship to said one end of the latter within the path of travel of said images emanating from the body, said screen being disposed across and adjacent to said open end of the body when the sleeve is at one end of its path of travel and spaced outwardly therefrom when the sleeve is at the opposite end of its path of travel, said screen being adapted to pass the images and display the same on the outer face thereof.

References Cited in the file of this patent

UNITED STATES PATENTS

| | | |
|---|---|---|
| 1,746,607 | Readeker | Feb. 11, 1930 |
| 1,827,598 | Merriman | Oct. 13, 1931 |
| 2,032,116 | Conrad et al. | Feb. 25, 1936 |
| 2,268,450 | Haggett | Dec. 30, 1941 |
| 2,565,496 | Gordon | Aug. 28, 1951 |

FOREIGN PATENTS

| | | |
|---|---|---|
| 158,211 | Great Britain | June 8, 1930 |